April 26, 1966 RICHARD C. CHU ETAL 3,247,896

COMPONENT HEAT REMOVAL DEVICE

Filed Dec. 27, 1963

INVENTORS
RICHARD C. CHU
JOSEPH W. REIS

BY J W Armbruster
ATTORNEY 3,247,896

COMPONENT HEAT REMOVAL DEVICE

Richard C. Chu and Joseph W. Reis, Wappingers Falls, N.Y., assignors to International Business Machines Corporation, New York, N.Y., a corporation of New York Filed Dec. 27, 1963, Ser. No. 333,920
7 Claims. (Cl. 165—80)

This invention relates to cooling devices for electronic equipment and more particularly to simple and inexpensive means for dissipating the heat of small components such as rectifiers and transistors.

Not only do such electronic devices generate heat, but they are often confined while doing so in the restricted areas called for by the close spacing of high density packaging. Therefore, it is important to dissipate this heat for the benefit of the electronic package as a whole as well as for the efficient performance and reliability of each component. Such heat dissipation is of special importance in the case of components in which the maximum temperatures at which the device will operate is strictly limited.

Heretofore, the heat sinks and heat dissipation of the prior art required either massive blocks with connections to chassis walk or bases, or bulky finned or looped constructions which often harmfully confined the heated air instead of expediting its removal. The present invention provides an inexpensive sheet metal radiator which is formed with an inner self-retaining clip and a pair of parallel outer ears as L shaped members which not only radiate heat but also serve as convection aids for dynamic funneling of air flow over and away from an equipped component. Since said parallel members are of appreciable length, a series of them when serially oriented and arranged assembled on a row or column of components, line up to form what is practically a continuous air flow conduit.

An object of the invention is to provide an improved heat removal device for electronic components, which device can be easily applied by hand without tools or shocking force, retain itself in place, and markedly expedite the removal of heat from the component by aiding radiation and air flow convection.

Another object of the invention is to provide a novel economical form of heat radiator which is formed of a single strip of bent sheet metal with very little or no scrap waste. Out of a rectangular strip of stock a pair of inwardly formed V sections are cut and bent and oppositely as arcuate cup clamps, said V sections being struck out of the center of one pair of ends of the strip. The other ends of the strip, not only form the support for the cup clamp but also are formed as flared sections having bent down edges of appreciable length to act as radiators and also as air flow guides, channels and expediters.

Another object of the invention is to provide a novel combined form of heat conduction, radiation and convection devices to apply to components such as transistors. The present simple sheet metal disc is sophisticated in action because its inner clip cup conducts heat from a transistor can to both a large outer U shaped radiating surface or channel member and also to the inner chamber between L shaped ears wherein air is funneled directly past the heated clip and can surfaces to carry away the heat by convection flow aided by the channeled constructional feature of the device. Because of the excellent heat dissipating properties per unit area of the present device, it is possible to package small components with higher density than heretofore.

A further object of the invention is the provision of a novel heat dissipating device which is highly efficient both thermally and aerodynamically and offers less obstruction to cooling air flow than the more bulky and expensive prior art devices. Since air flow is facilitated it is possible to use smaller air fans and blowers per unit of circuitry surface which becomes increasingly important in chassis design for large data processing machines.

A further object of the invention is to provide a heat dissipating device with novel channel convection construction whereby selective control over air flow direction and action may be attained. The long parallel side members on each cooling device adapt the device for selective orientation and air diversion either as a simple unit or for combined effects with several devices arranged to secure a desired spot heating or cooling effect. Although usually used with successive channels aligned to facilitate the flow of cooling air over and away from components, it is possible because of the adjustable angular assembly nature of a device's channel relative to fixed components to focus heated or cool air on one spot or one component, divert heated or cool air away from one spot or one component, or to cause turbulence of air flow at any spot by causing conflict of air streams or obstruction of an air stream by assembling a device with its channel at right angles or an obstruction angle to the direction of normal air flow.

The foregoing and other objects, features and advantages of the invention will be apparent from the following more particular description of preferred embodiments of the invention, as illustrated in the accompanying drawings.

Figure 1:
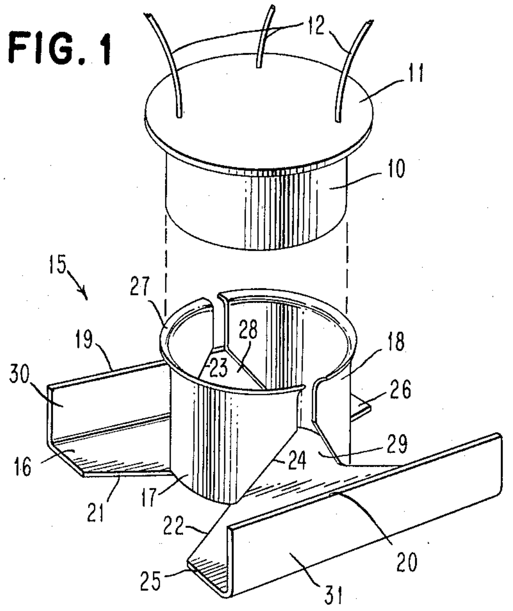
FIGURE 1 is a perspective view showing the heat dissipating device arranged below a transistor prior to being clipped thereon.
Figure 2:
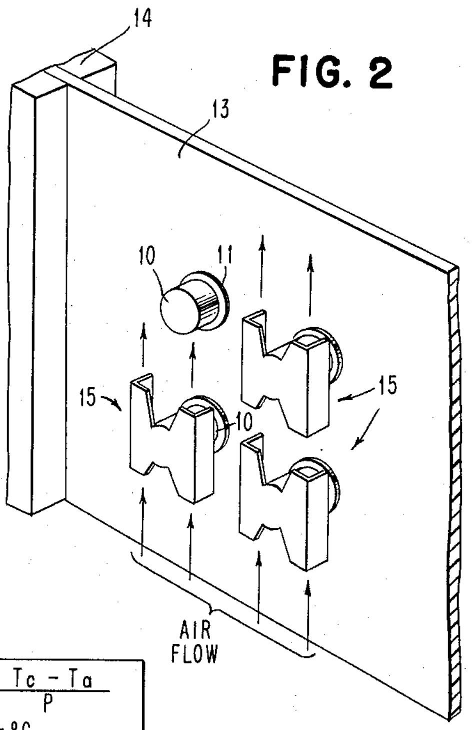
FIGURE 2 is a perspective view showing a plurality of heat dissipating devices on components and arranged individually or in a row to act together in channeling air flow.

Referring to FIGURE 1, the reference character 10 designates the cylindrical cover of a can of a transistor or any other heat generating component. Such components covers 10 are usually formed with a flange 11 and a series of conductive leads 12 extending for circuit connection. Usually such components 10 are mounted, as shown in FIGURE 2, on a printed circuit board 13 which is removably plugged into a socket 14. Components 10 are usually arranged on board 13 in rows and columns and rigidly fixed thereon with the leads soldered to different printed circuit conductors (not shown) on one face of the board. Since some designs involve hundreds of components such as 10 in the form of transistors, rectifiers, resistances, etc. which in performing their amplifying, blocking and restriction of electrical and electronic effects, generate a good deal of heat in, on and over the surfaces of boards such as board 13, rarely is it possible to provide enough air space and component spacing for ordinary convection to dissipate the heat. Overall machine size usually dictates high density packaging with many active components closely spaced so that an efficient aid to heat dissipation by many novel facets of contraction for heat conduction, radiation and convection, as here disclosed, becomes highly desirable.

In FIGURE 1 a general designation 15 is applied to the novel heat removal device of the present invention. It is seen that device 15 is formed from a single piece of sheet metal stock as strip or coil material of beryllium copper, or any metal of good heat conduction qualities and yet with resilient qualities also such as phosphor, bronze or the like. The flat part 16 is in the plane of the strip before forming, with the length of the original strip running from the upper left to the lower right as seen in FIGURE 1, and cup portions 17 and 18 being formed upwardly before the device is cut to length at ends 19 and 20. The generally-triangular clamp portions 17 and 18 are struck up directly out of the strip stock or bent from arcuate edges of the center section without waste which is noted by the matching V lines 21 and 22 in the stock plane with the lines 23 and 24 of the clamp 17. The opposite clamp side 18 is similarly struck up out of the center line of the stock 16 between ends 19 and 20.

As shown proportioned in FIGURE 1, the cup clamps 17 and 18 have an outwardly curved rim 27 and are of lengths which originally extended beyond the sides 25 and 26 of the stock plane 16. These proportions do result in some scrap portions at the corners, but it is obvious that the cup clamps may be made shorter or the width of the stock greater, or both, to the point where the original edge of rim 27 coincides with edge 25 so that there is no scrap or waste material at all and the strip length portion is used completely.

Cup clamp portions 17 and 18 are formed arcuately to an inside diameter which is slightly smaller than the diameter of the cylindrical body 10 of the component upon which or over which it is pressed. The flared or curved rim 27 of the cup portions aids in initially seating the device 15 on the curved top of can 10 so that the portions 17 and 18 spread outward gradually and the cup 17, 18, when pressed by a finger against plane 16, slips smoothly on the can 10 as a sheath assembled without shocks or jars and without effect on the inner connections of component 10. The resilience of the material urges the generally-inverted-V-shaped fingers 17, 18 inward to grip firmly when once pressed to the assembled position. Between the fingers, a substantial side part of the component will be exposed. Device 15 is proportioned so that usually the clamp portions 17 and 18 are equal to or shorter than the can body 10. This brings the component in contact with the top or center section of the dissipator 15 for best performance in heat conduction radiation and convection. Other proportions of clamp lengths 17 and 18 are possible for more universal use of one dissipator design.

FIGURE 1 shows that the device ends 19 and 20 are bent at right angles to form two long parallel L shaped members or ears 30 and 31 which are equally spaced from the center of the cup clamp 17, 18. These elongated flared sections (together forming a channel member) not only act as radiators for heat conducted thereto through the clamp 17, 18 and plane 16, but they also act as aerodynamic guides or conduits either alone or when aligned with others of the same kind in rows or columns as shown in FIGURE 2. Since the extending walls or edge parts of members 30 and 31 are long and parallel they are adapted for orientation and adjustment angularly on a component to aid, divert, focus or hinder air flow thereover as desired. The L members 30 and 31 are spaced far enough from the body of the clamp 17, 18 to allow ample free air flow space therebetween, and the height of the vertical wall or bent-down edge of members 30, 31 is high enough to act as an air fin, wing or guide without causing air confinement and coming too close to the board 13 when assembled as shown in FIGURE 2.

It is noted hereinbefore that the extending clamps 17, 18 which are bent down from the arcuate sides of the center section have resilient gripping action to hold device 15 in the assembled position on a component 10. The position or orientation of the parallel members 30, 31 which extend beyond the profile of the fingers may be selected by hand as the device 15 is pressed onto a component 10 with the clamp 17, 18 sliding down over the outside of the component with a firm gripping action, and when seated the device may be given a final short angular motion either way to set the members 30, 31 in the exact angle desired.

It is contemplated that the device of FIGURE 1 could be made of two pieces of material, with the plane 16 and members 30, 31 formed of a good heat conductor and radiator such as extruded aluminum, and a separate thin resilient beryllium copper cup clamp 17, 18 could be attached to the center of the aluminum plane 16.

When the device 15 is assembled on a protruding component 10, the spaces on each side of the component, i.e., the space between the curved component wall and the inner channel face is of the form of a tapered or constricted throat which is of a Venturi form and the flow of a fluid medium therethrough would follow Venturi principles.

FIGURE 2 shows three such devices 15 assembled relative to four components 10 in rows and columns on board 13. At the left it is seen that a single device 15 may be effective alone to aid the upward flow of cooling air to remove the heat from the component upon which it is mounted and also direct such air directly over an unequipped component in the same column. The channels of the single device 15 are deliberately arranged truly vertical because the air stream is in that direction and because one or more components may be directly above device 15 and in positions to be aided by confined air flow therefrom.

At the right, FIGURE 2, a pair of devices 15 are mounted on a pair of components in the same column and directly above each other. Here the channels of the two devices are deliberately arranged truly vertical to form an almost continuous air passage or conduit for the upwardly flowing air. This package or arrangement may be carried out over short or long stretches of circuit board surface and is a novel form of aerodynamic funneling for extra effectiveness of convection removal of heat by a newly shaped heat dissipating device. It is because the members 30, 31 are shaped and arranged parallel as they are that it is possible to orient one or more of the heat removal devices for greater overall effectiveness for removing heat by radiation without forced air flow, or for removing heat by both radiation and convection with forced air pressure.

Although the showing in FIGURE 2 deals with a very useful arrangement of components and heat dissipating devices 15, it is contemplated that there could be instances when straight free channeling of air flow is not as desirable as focused, diverted or turbulent air treatment. Since device 15 is adaptable for a varied assortment of heat transfer situations, it is believed well to point out its flexibility. By merely orienting the positions of several devices 15 a wide variety of air cooling or heating arrangements are made possible. For example, in FIGURE 2, should it be desirable to raise the working temperature of the unequipped component 10 at the upper left, air diversion may be effected by merely tilting the device 15 at the left, towards the upper left corner and tilting the two devices 15 at the right towards the upper right corner. With the devices 15 so arranged, most of the cooling air flow is diverted away from the exposed component.

In a reverse manner, more than the usual amount of air flow could be focused in any one spot. Taking the same location of the exposed component 10 in FIGURE 2 and imagining that it requires extra cooling treatment, then the two devices 15 at the right could be tilted or swung around towards the upper left corner to focus more than one column of air against the exposed component.

It is possible also that occasions could arise making turbulence of air and heated air desirable in one place or all over the board. This could be realized by setting devices 15 to deliberately cause opposition and conflict between different air columns, and also by turning one or more devices 15 to positions wherein the ears or members 30, 31 are at right angles to the air flow to form a bucking barrier and create air turbulence.

Figure 3:
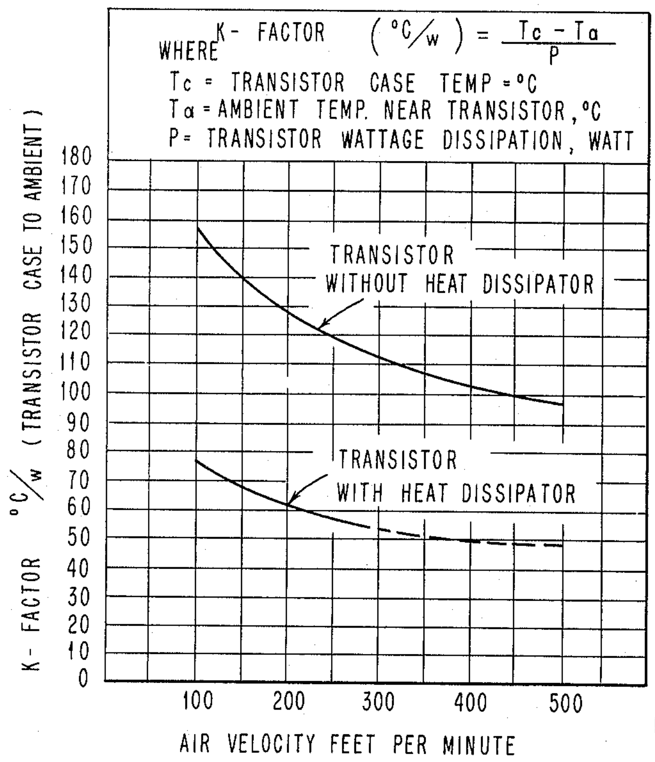
FIGURE 3 is a chart showing the beneficial effects of the presence of the heat dissipation of the present invention in keeping the K factor (external thermal resistance) of a transistor low for various velocities of air.

The chart, FIGURE 3, shows the marked advantages in heat dissipation brought about by use of the devices and mode of operation of the present invention. Ranges of heat removal values are plotted with and without a heat dissipation device and for different air velocities. The K factors are values formed by dividing temperature difference in ° C. at a component surface by the heat in watts generated by the component. Air velocities were considered from about 100–500 feet per minute. It is shown generally that the K factor values were cut in half when the heat dissipation device was used to aid in removal of heat.

While the invention has been particularly shown and described with reference to preferred embodiments thereof, it will be understood by those skilled in the art that various changes in form and details may be made therein without departing from the spirit and scope of the invention.

What is claimed is:

1. A heat removal device for attachment to an electrical component comprised of:
   a center section adapted to contact an end portion of the component,
   clamp means extending from said center section for attaching the device onto a component, and
   a channel member extending from said center section at opposite parts thereof and terminating in parallel edge parts extending in the same direction as the clamp means so that large heat-radiating surfaces are provided and so that air is guided under the channel member.

2. The device according to claim 1 and being further characterized by:
   said clamp means being two fingers which face each other and are adapted to engage a component so that the component sides facing said edge parts are substantially exposed.

3. The device according to claim 2 and being further characterized by:
   said fingers being generally-inverted-V-shaped, and
   said device being formed from a single piece of sheet metal with said fingers bent down from the other opposite parts of said center section.

4. A sheet metal heat dissipator for cylindrical electronic components comprised of:
   a center section having two arcuate clamping fingers bent down from opposed arcuate sides of the center section,
   said clamping fingers having a generally-inverted-V-shape,
   two flared members intgeral with, and extending from, the ends of said center section,
   each of said flared members being elongated to extend substantially beyond the profile of the clamping fingers, and
   each flared member having a bent-down outer edge so that air is channeled in parallel flows along the exposed sides of the component between the clamping fingers when the device is mounted on a component.

5. A heat dissipating device for clamping on a cylindrical transistor and formed from a single section of sheet metal comprised of:
   a center section adapted to contact an end portion of said transistor,
   two flared end sections extending from the opposite end parts of said center section and terminating in parallel edge parts extending perpendicularly to the center section to provide flared members of L-shaped cross-section,
   two generally-inverted-V-shaped arcuate fingers formed from the sheet metal between the respective facing flared sections and bent in the same direction as the edge parts from the opposite sides of said center section to provide for resilient, heat conductive attachment to the transistor, and
   said flared L-shaped members providing extended heat radiating surfaces and being dimensioned to channel cooling air along the exposed sides of the transistor between the fingers.

6. A heat dissipating device for clamping on a cylindrical transistor comprised of:
   a short strip of beryllium copper sheet metal having opposed generally-triangular side parts thereof bent to form two facing arcuate fingers and a center section with arcuate side edges,
   the remainder of said strip providing two flared sections extending from the end parts of said center section,
   said center section being adapted to contact an end portion of a transistor which is clamped by said fingers, and
   said flared sections terminating in respective walls extending in the same direction as said fingers and which are parallel to each other so that a channel member is provided which extends beyond the profile of said fingers and channels air under the flared sections and along the sides of a transistor which would be exposed between the edges of said fingers.

7. An electronic package for providing improved cooling by air comprised of:
   a board having a plurality of cylindrical electronic components mounted thereon and arranged in columns,
   a heat dissipating device mounted on each of said components,
   each device being formed from a piece of sheet metal and having a center section contacting an end portion of said component, two flared members of L-shaped cross-section opposite each other with walls extending in parallel relation along the sides of the components and two generally-inverted-V-shaped, arcuate fingers extending in the same direction as said walls and engaging opposed sides of the component between the adjacent parts of the flared members, and
   said components being so spaced and said devices being so constructed and oriented on said components that said parallel walls of said members are aligned so that an air flow, after passing under the members of one device will move in a columnar direction toward the next component and its aligned heat dissipating device.

References Cited by the Examiner

UNITED STATES PATENTS

| | | | |
|---|---|---|---|
| 1,684,973 | 9/1928 | Sears. | |
| 2,917,286 | 12/1959 | Deakin | 165—80 |

FOREIGN PATENTS

| | | |
|---|---|---|
| 673,554 | 6/1952 | Great Britain. |
| 768,103 | 2/1957 | Great Britain. |
| 836,401 | 6/1960 | Great Britain. |

OTHER REFERENCES

Publication: International Electronic Research Corp., "New Product Bulletin" (NP 131); December 1, 1961; 135 West Magnolia Blvd., Burbank, Calif. P.O. Box 271.

ROBERT A. O'LEARY, *Primary Examiner.*

CHARLES SUKALO, *Examiner.*

A. W. DAVIS, *Assistant Examiner.*